(12) United States Patent
Ando

(10) Patent No.: US 10,719,032 B2
(45) Date of Patent: Jul. 21, 2020

(54) FLUID STORAGE DEVICE

(71) Applicant: Murata Manufacturing Co., Ltd., Nagaokakyo-shi, Kyoto-fu (JP)

(72) Inventor: Masamichi Ando, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 55 days.

(21) Appl. No.: 15/916,814

(22) Filed: Mar. 9, 2018

(65) Prior Publication Data

US 2018/0203379 A1    Jul. 19, 2018

Related U.S. Application Data

(63) Continuation of application No. PCT/JP2016/081804, filed on Oct. 27, 2016.

(30) Foreign Application Priority Data

Dec. 9, 2015 (JP) ................. 2015-239861

(51) Int. Cl.
*B01F 7/00* (2006.01)
*G03G 15/08* (2006.01)
*G01F 23/22* (2006.01)
*B01F 3/18* (2006.01)
*G01F 23/00* (2006.01)
*B01F 15/00* (2006.01)
*G01L 5/161* (2020.01)
(Continued)

(52) U.S. Cl.
CPC ........... *G03G 15/0867* (2013.01); *B01F 3/18* (2013.01); *B01F 7/0005* (2013.01); *B01F 13/005* (2013.01); *B01F 15/00155* (2013.01); *B01F 15/00201* (2013.01); *G01F 23/0007* (2013.01); *G01F 23/22* (2013.01); *G01L 3/20* (2013.01); *G01L 3/22* (2013.01); *G01L 5/161* (2013.01); *G03G 15/0856* (2013.01); *G01F 23/226* (2013.01); *G03G 15/0889* (2013.01); *G03G 2215/085* (2013.01)

(58) Field of Classification Search
CPC ..................................................... B01F 7/0005
USPC ........................................................ 366/142
See application file for complete search history.

(56) References Cited

U.S. PATENT DOCUMENTS 3,894,433 A * 7/1975 Riester ................... G01F 1/24
                                                     73/861.56
4,285,236 A * 8/1981 Chien .................... E21B 44/00
                                                     340/539.1
(Continued)

FOREIGN PATENT DOCUMENTS

| CN | 103492832 A | 1/2014 |
|---|---|---|
| JP | H0495724 A | 3/1992 |
| JP | 2009139207 A | 6/2009 |

OTHER PUBLICATIONS

International Search Report issued in International Application No. PCT/JP2016/081804, dated Nov. 22, 2016.

(Continued)

*Primary Examiner* — David L Sorkin
(74) *Attorney, Agent, or Firm* — Arent Fox LLP

(57) ABSTRACT

A fluid storage device includes a container and a torsion sensor. The container stores a fluid to be agitated. The torsion sensor has a substrate and detects torsion of the substrate. The substrate has a first end inserted in the container and a second end fixed to the container or a housing.

21 Claims, 11 Drawing Sheets

(51) Int. Cl.
*G01L 3/20* (2006.01)
*B01F 13/00* (2006.01)
*G01L 3/22* (2006.01)

(56) References Cited

U.S. PATENT DOCUMENTS

| | | | | | |
|---|---|---|---|---|---|
| 4,307,619 | A | * | 12/1981 | Herzl | G01F 1/3263 73/861.24 |
| 4,339,957 | A | * | 7/1982 | Herzl | G01F 1/3263 73/861.24 |
| 4,445,388 | A | * | 5/1984 | Herzl | G01F 1/3209 73/861.24 |
| 4,550,614 | A | * | 11/1985 | Herzl | G01F 1/3227 137/804 |
| 4,747,690 | A | * | 5/1988 | Hayashi | A21C 1/146 366/141 |
| 5,906,432 | A | * | 5/1999 | Wade | A21C 1/02 366/100 |
| 7,288,229 | B2 | * | 10/2007 | Turner | B01F 15/00454 422/130 |
| 10,213,755 | B2 | * | 2/2019 | Luharuka | B01F 15/00201 |
| 2008/0098810 | A1 | * | 5/2008 | Skinner | G01F 23/72 73/323 |
| 2009/0254288 | A1 | * | 10/2009 | Chase | G01L 1/20 702/42 |
| 2011/0109204 | A1 | * | 5/2011 | Tajitsu | H01L 41/193 310/348 |
| 2014/0049137 | A1 | | 2/2014 | Ando et al. | |
| 2015/0168237 | A1 | * | 6/2015 | Tajitsu | G06F 3/041 73/862.621 |

OTHER PUBLICATIONS

Written Opinion of the International Searching Authority issued in International Application No. PCT/JP2016/081804, dated Nov. 22, 2016.

* cited by examiner

FLUID STORAGE DEVICE

CROSS REFERENCE TO RELATED APPLICATIONS

The present application is a continuation of PCT/JP2016/081804 filed Oct. 27, 2016, which claims priority to Japanese Patent Application No. 2015-239861, filed Dec. 9, 2015, the entire contents of each of which are incorporated herein by reference.

TECHNICAL FIELD

The present disclosure relates to a fluid storage device that stores a fluid and detects the amount of the fluid.

BACKGROUND

Conventionally, fluid storage devices that store fluids and detect the amounts of the fluids therein are known. For example, Patent Document 1 (identified below) discloses a carbonization furnace for storing a powder (which is a kind of fluid), a stirring tank for agitating the powder, and a detector for detecting the powder surface of the powder.

The detector has a plate-like shape and is partially fixed to the carbonization furnace. In order to control the supply amount of the raw material powder and the discharge amount of the product powder in the carbonization furnace, the detector detects the powder surface by detecting the force generated on the powder during stirring.

Patent Document 1: Japanese Patent Application Laid-Open No. 2009-139207.

In the design disclosed in Patent Document 1, external vibrations including vibrations of the stirring tank may propagate to the detector via the carbonization furnace in some cases. Further, the detector disclosed in Patent Document 1 may cause bending displacement of bending in the thickness direction of the detector in some cases due to its plate-like shape.

Therefore, the conventional detector in Patent Document 1 has the problem that, even if the detector is not brought into contact with the powder, an electrical signal may be generated in the detector due to the bending displacement, and thereby leading to false detection.

SUMMARY OF THE INVENTION

An object of the present disclosure is to provide a fluid storage device that can detect the amount of a fluid and prevent false detection due to external vibration.

Thus, a fluid storage device according to an exemplary embodiment of the present disclosure that includes a container and a torsion sensor. The container stores a fluid to be agitated. The torsion sensor has a substrate, and detects torsion of the substrate. The substrate has a first end inserted into the container and a second end fixed.

In this configuration, the fluid can be a liquid or a powder, for example. The first end of the substrate is inserted into the fluid stored in the container. In this regard, the first end of the substrate is deformed into a torsional shape by the movement of the fluid agitated. Then, when the fluid stored in the container decreases beyond a predetermined position, the first end of the substrate is no longer inserted in (i.e., not in contact with) the fluid. As a result, the substrate returns to its original shape without any torsion of the first end. Therefore, the torsion sensor can detect the amount of the fluid based on the torsional state of the substrate.

On the other hand, also in the fluid storage device according to the exemplary aspect, external vibration including vibration caused by agitation of the fluid may propagate from the second end to the torsion sensor. Therefore, the exemplary torsion sensor may also cause bending displacement due to external vibration.

The exemplary torsion sensor is thus configured to detect torsion of the substrate, but not a sensor that detects bending of the substrate. Generally, the possibility that substrate causes torsional vibration due to external vibration is extremely low as compared with the possibility that the substrate causes bending vibration due to external vibration. Therefore, the exemplary twist sensor can advantageously prevent false detection due to external vibration.

As such, the exemplary fluid storage device can detect the amount of the fluid, while also preventing false detection due to external vibration.

In addition, in the fluid storage device according to an exemplary embodiment of the present disclosure, the first end is preferably inserted to a predetermined position in the container.

In this configuration, when the fluid is stored up to a predetermined position, the substrate undergoes torsion by the movement of the fluid agitated, and the substrate undergoes no torsion when the fluid is not stored up to the predetermined position. Therefore, the exemplary torsion sensor can detect whether the fluid is stored to the predetermined position or not.

In the fluid storage device according to an exemplary embodiment of the present disclosure, the first end preferably agitates the fluid in the container, and thus rotates the fluid.

Thus, the exemplary torsion sensor detects the torsion of the substrate, and agitates the fluid with the substrate. More specifically, the exemplary fluid storage device can further agitate the fluid with the torsion sensor.

In the fluid storage device according to an exemplary embodiment of the present disclosure, the first end has a first corner and a second corner, and the first end is preferably inserted into the container at a position for displacement of the first corner and the second corner in opposite directions.

For example, the first end is preferably inserted into the center of the rotating fluid.

In this configuration, the first corner and the second corner of the substrate are displaced in opposite directions by the movement of the fluid agitated, thereby deforming the first end into a torsional shape.

In addition, for example, it is preferable for only one of the first corner and the second corner to be inserted into the fluid.

In this configuration, any one of the first corner and the second corner of the substrate is displaced by the movement of the fluid agitated, thereby deforming the first end into a torsional shape.

In addition, for example, preferably, the substrate has a connection connected to the first corner, and the connection is inserted into the fluid.

In this configuration, the connection of the substrate is displaced by the movement of the fluid agitated, the first corner is displaced by the displacement of the connection, and the first end is deformed into a torsional shape.

Further, preferably, the torsion sensor further includes a piezoelectric element attached to the substrate, and the torsion of the substrate is detected by the piezoelectric element. The piezoelectric element preferably has a film made from a chiral polymer. The chiral polymer is preferably a polylactic acid. Further, the stretching direction of the film preferably coincides with the longitudinal direction of the substrate.

Thus, the exemplary twist sensor can detect the displacement of the substrate with certainty and high sensitivity.

In sum, the fluid storage device according to the exemplary embodiments of present disclosure can detect the amount of the fluid, and prevent false detection due to external vibration.

DETAILED DESCRIPTION

A fluid storage device according to a first exemplary embodiment will be described below.

Figure 1:
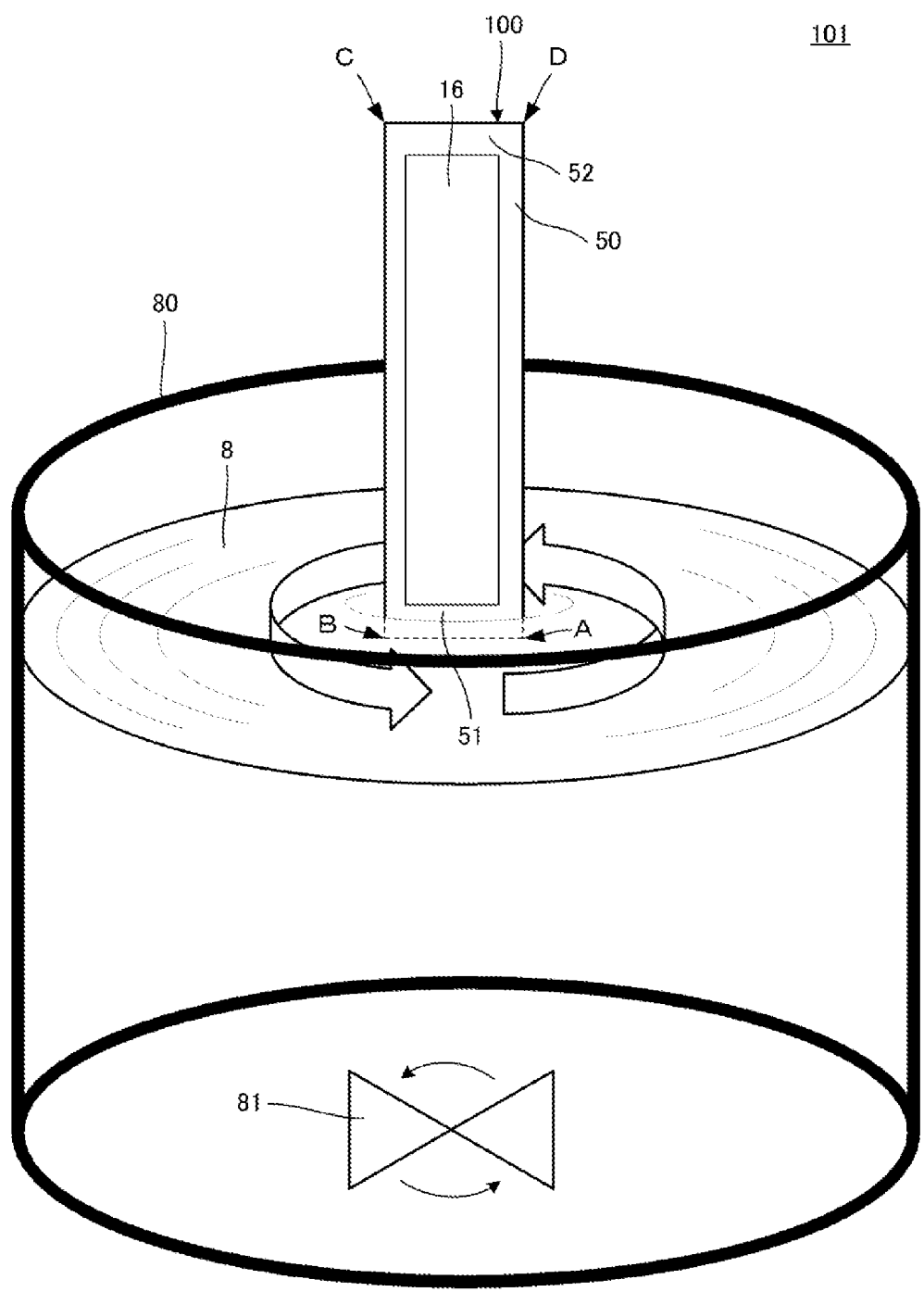
FIG. 1 is an external view schematically illustrating a fluid storage device 101 according to a first exemplary embodiment.

FIG. 1 is an external view schematically illustrating a fluid storage device 101 according to a first exemplary embodiment. The fluid storage device 101 includes a stirrer 81, a container 80, and a torsion sensor 100. The container 80 stores a powder 8. The stirrer 81 rotates in the direction indicated by the arrow in FIG. 1, and agitates the powder 8 housed in the container 80. Thus, the powder 8 rotates in the direction indicated by outlined arrows in FIG. 1.

The torsion sensor 100 has a sensor unit 16 and a substrate 50. In the torsion sensor 100, the torsion of the substrate 50 is detected by the sensor unit 16. The sensor unit 16 is attached on the substrate 50. The substrate 50 has a first end 51 inserted into the container 80 and a second end 52 fixed. The material for the substrate 50 is a metal such as SUS (Stainless Steel), for example.

The first end 51 is inserted to a predetermined position in the container 80. In addition, the first end 51 has a corner A and a corner B. The first end 51 is inserted into the container 80 at a position for displacement of the corner A and the corner B in opposite directions. For example, the first end 51 is inserted into the center of the rotating powder 8. In this regard, the corner A corresponds to an example of the first corner according to the present disclosure, and the corner B corresponds to an example of the second corner of the present disclosure.

The second end 52 is fixed to, for example, a housing (not shown) or the container 80 of the fluid storage device 101.

It is noted that the fluid storage device 101 is provided, for example, in an image forming device. The powder 8 is, for example, a toner. The image forming device forms an electrostatic latent image on the surface of a photosensitive drum. The image forming device develops the electrostatic latent image by supplying the toner to the photosensitive drum through a developing device. The toner is consumed for each development by the developing device. Therefore, the toner stored in a toner bottle is supplied to the container 80 of the fluid storage device 101, and the toner supplied to the container 80 is replenished to the developing device.

The fluid storage device 101, for example, includes the torsion sensor 100 for checking the presence or absence of the toner supplied to the container 80. Thus, even if there is no toner left in the toner bottle, because the toner is stored in the container 80 of the fluid storage device 101, the time required for removing the emptied toner bottle and then replacing the bottle with a new toner bottle can be secured without stopping the printing operation of the image forming device. More specifically, the fluid storage device 101 can continue the image forming operation while the toner bottle is exchanged.

Figure 2:
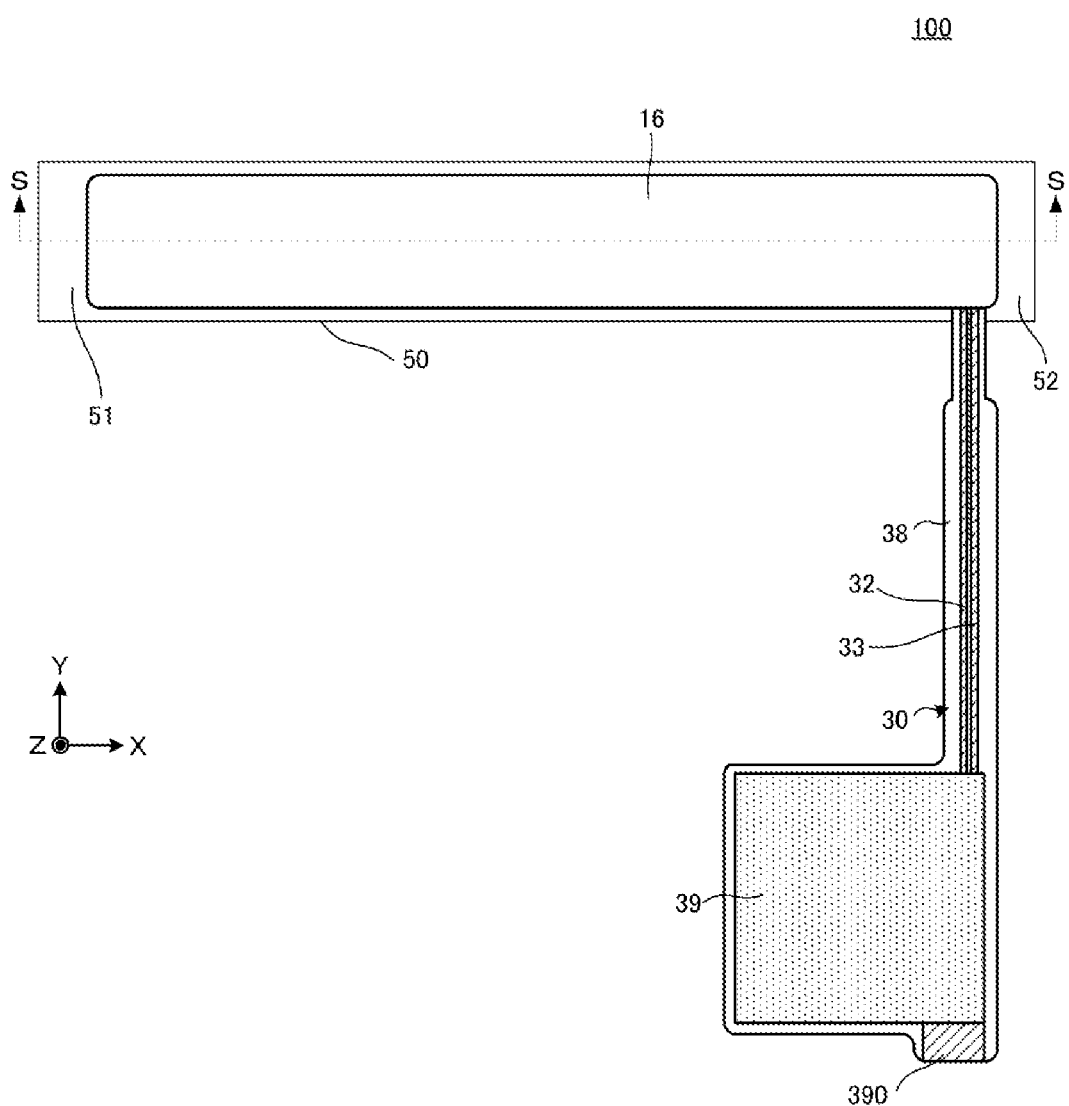
FIG. 2 is a plan view of the torsion sensor 100 shown in FIG. 1.
Figure 3:
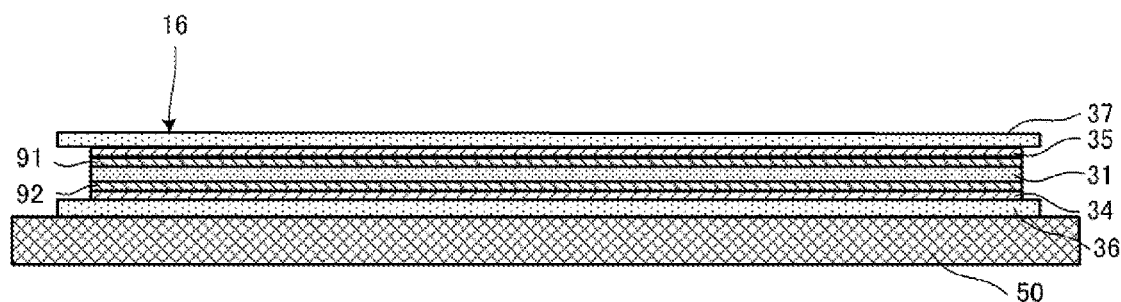
FIG. 3 is a cross-sectional view taken along the line S-S shown in FIG. 2.
Figure 3:
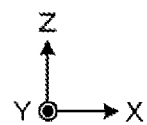
Figure 4:
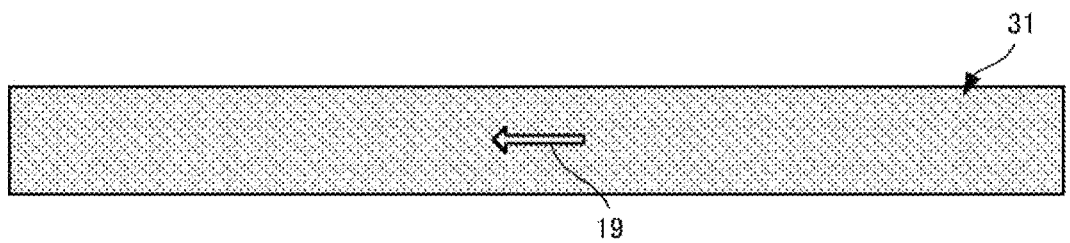
FIG. 4 is a plan view of a piezoelectric film 31 provided in a sensor unit 16 of the torsion sensor 100 shown in FIG. 2.
Figure 4:
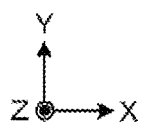

FIG. 2 is a plan view of the torsion sensor 100 shown in FIG. 1. FIG. 3 is a cross-sectional view taken along the line S-S shown in FIG. 2. FIG. 4 is a plan view of a piezoelectric film 31 provided in the sensor unit 16 of the torsion sensor 100 shown in FIG. 2. It is to be noted that the illustration of the torsion sensor 100 other than the sensor unit 16 and the substrate 50 is omitted in FIG. 1.

As shown in FIG. 2, the torsion sensor 100 includes the sensor unit 16, the substrate 50, a component mounting unit 38, and a detection circuit 39 composed of circuit components. As shown in FIGS. 2 and 3, a printed board unit 36, a printed board unit 37, and the component mounting unit 38 are made from a flexible printed board 30. The material for the flexible printed board 30 is, for example, a resin such as polyimide. The detection circuit 39 amplifies a weak signal detected by the sensor part 16, and outputs the detection signal.

On the front main surface of the component mounting unit 38, a first terminal 32 and a second terminal 33 are formed, which are conductor patterns. Further, the detection circuit 39 and an output terminal 390 are mounted on the front main surface of the component mounting portion 38.

As shown in FIGS. 2 and 3, the first terminal 32 has a first end connected to a first detection electrode 34. On the other hand, the first terminal 32 has a second end connected to the detection circuit 39. Further, the second terminal 33 has a first end connected to a second detection electrode 35. On the other hand, the second terminal 33 has a second end connected to the detection circuit 39.

Therefore, as shown in FIGS. 2 and 3, the detection circuit 39 is connected to the first detection electrode 34 and the second detection electrode 35 via the first terminal 32 and the second terminal 33. In addition, the detection circuit 39 is connected to the output terminal 390.

Next, as shown in FIG. 3, the sensor unit 16 has the piezoelectric film 31, a pressure-sensitive adhesive layer 91, a pressure-sensitive adhesive layer 92, the first detection electrode 34, the second detection electrode 35, the printed board unit 36, and the printed board unit 37.

As shown in FIG. 3, the first detection electrode 34, the second detection electrode 35, the piezoelectric film 31, the printed board unit 36, and the printed board unit 37 each have, in the form of a flat plate, front and back main surfaces opposed in the thickness direction. It is to be noted that the upper surface in FIG. 3 is referred to as the front main surface, and the lower surface therein is referred to as the back main surface.

As shown in FIG. 3, the printed board unit 37, the second detection electrode 35, the pressure-sensitive adhesive layer 91, the piezoelectric film 31, the pressure-sensitive adhesive layer 92, the first detection electrode 34, and the printed board unit 36 are stacked in this order from the front main surface to the back main surface.

Specifically, the second detection electrode 35 is stacked on the front main surface of the piezoelectric film 31 with the pressure-sensitive adhesive layer 91 interposed therebetween, and the printed board unit 37 is further stacked on the front main surface of the second detection electrode 35. In addition, the first detection electrode 34 is stacked on the back main surface of the piezoelectric film 31 with the pressure-sensitive adhesive layer 92 interposed therebetween, and the printed board unit 36 is further stacked on the back main surface of the first detection electrode 34.

It is noted that each of the second detection electrode 35, the first detection electrode 34, the piezoelectric film 31, the printed board unit 37, and the printed board unit 36 has a substantially rectangular outer shape in plan view. The outer shapes of the printed board unit 37 and the printed board unit 36 are slightly larger than the outer shape of the piezoelectric film 31.

The second detection electrode 35 is formed on the back main surface of the printed board unit 37, and the first detection electrode 34 is formed on the front main surface of the printed circuit board unit 36. As shown in FIG. 3, the piezoelectric film 31 is attached to the front main surface of the first detection electrode 34 with the pressure-sensitive adhesive layer 92. In addition, the piezoelectric film 31 is attached to the back main surface of the second detection electrode 35 with the pressure-sensitive adhesive layer 91. It is noted that the pressure-sensitive adhesive layer 91 and the pressure-sensitive adhesive layer 92 are composed of, for example, an acrylic pressure-sensitive adhesive in an exemplary aspect.

As a role configuration of the detection electrodes, it is preferable to adopt the second detection electrode 35 as a reference potential electrode and the first detection electrode 34 as a charge detection electrode. In addition, the substrate 50 is preferably a metal, and preferably connected to the ground potential of the detection circuit 39. The adoption of such a configuration makes it possible to make the unit less likely to be affected by static electricity, electromagnetic noise, or the like.

Next, the structure of the piezoelectric film 31 will be described in detail.

As shown in FIG. 4, the stretching direction 19 of the piezoelectric film 31 coincides with the longitudinal direction of the substrate 50. To give details, the piezoelectric film 31 is molecularly oriented in the direction 19 that makes about 0° with respect to the long side of the piezoelectric film 31. The piezoelectric film 31 is molecularly oriented in the direction 19 that makes about 90° with respect to the short side of the piezoelectric film 31.

The piezoelectric film 31 is a film containing an L-type polylactic acid (PLLA) as its main material. PLLA, which is a chiral polymer where a main chain has a helical structure, has the property of exhibiting piezoelectricity through the orientation in a predetermined axial direction. This piezoelectric property is represented by a piezoelectric tensor component $d_{14}$ when the thickness direction of the piezoelectric film is regarded as a first axis, whereas the direction in which molecules of PLLA are oriented is regarded as a third axis. More specifically, the PLLA is a piezoelectric body which has a shear piezoelectric property.

In this regard, the angle of the direction 19 in the piezoelectric film 31 is not limited to 0° exactly with respect to the long side, but can be any angle close to 0°. As the angle of the direction 19 is closer to 0° with respect to the long side, the torsion force can be detected more efficiently.

Likewise, the angle of the direction 19 in the piezoelectric film 31 is not limited to 90° exactly with respect to the short side, but can be any angle close to 90°. As the angle of the direction 19 is closer to 90° with respect to the short side, the torsion force can be detected more efficiently.

Therefore, the term "substantially 0°" in the present disclosure means an angle within a predetermined range centered on 0°, for example, approximately 0°±10°. Likewise, the term "substantially 90°" in the present disclosure means an angle within a predetermined range centered on 90°, for example, approximately 90°±10°. These specific angles may be determined appropriately depending on the overall design based on the application of the torsion sensor and the characteristics for each unit.

It is noted that the piezoelectric film 31 is not limited to a film containing PLLA as its main material, but may be films containing other chiral polymers such as a D-type polylactic acid (PDLA) and a poly-γ-benzyl-L-glutamate (PBLG). However, the piezoelectric property of the piezoelectric film 31 containing, as its main material, a chiral polymer such as PLLA and PDLA is not exhibited by polarization of ions, unlike ferroelectrics such as polyvinylidene fluoride (PVDF) and PZT, but derived from the helical structure which is a characteristic structure of the molecule.

Therefore, it is unnecessary for the chiral polymer to exhibit piezoelectricity through poling treatment, unlike other polymers such as PVDF or piezoelectric ceramics that use piezoelectric crystal thin films, and the PVDF and the like are found to vary in piezoelectric constant, and in some cases, may decrease significantly in piezoelectric constant, but the piezoelectric constant of the chiral polymer is extremely stable over time.

Furthermore, the chiral polymer never produce pyroelectricity produced in other ferroelectric piezoelectrics. Therefore, the piezoelectric film 31 containing the chiral polymer as its main material can achieve a voltage in response to only the torsion force, without depending on the temperature change of the detection position in the case of detecting torsion.

In addition, the chiral polymer is a polymer which has flexibility, and thus not broken by large displacement, unlike piezoelectric ceramics. Therefore, the piezoelectric film 31 containing the chiral polymer as its main material is not broken even by a large amount of displacement, and the amount of displacement can be reliably detected. Therefore, the torsion sensor 100 can detect the displacement of the substrate 50 with certainty and high sensitivity.

Figure 5:
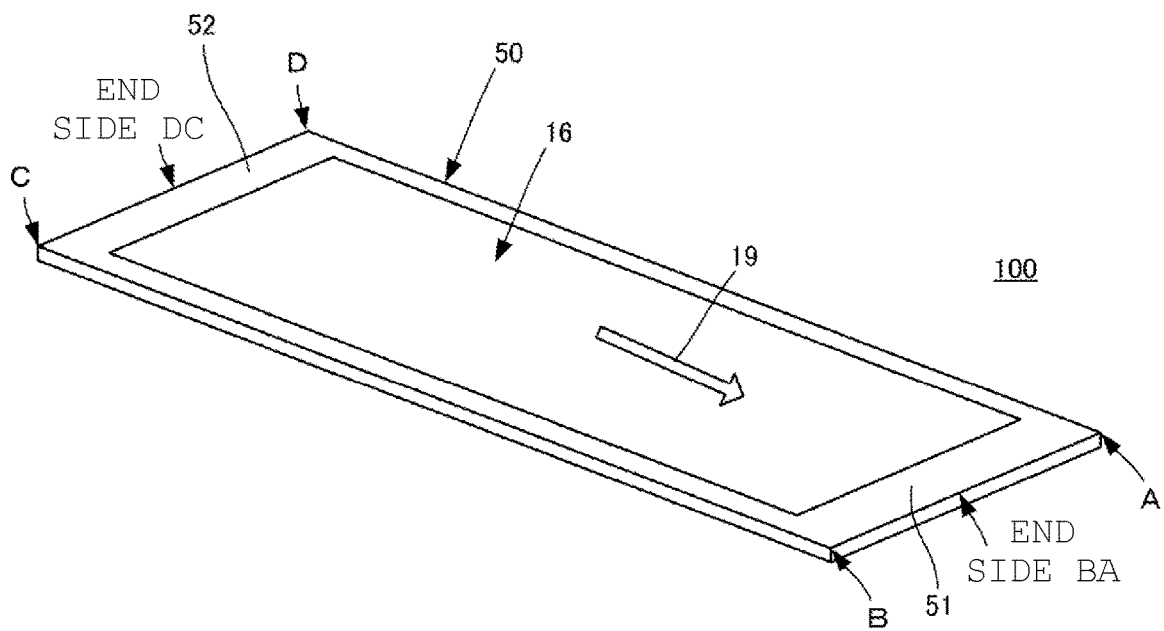
FIG. 5 is an external view schematically illustrating the sensor unit 16 and a substrate 50 of the torsion sensor 100 shown in FIG. 1.
Figure 6:
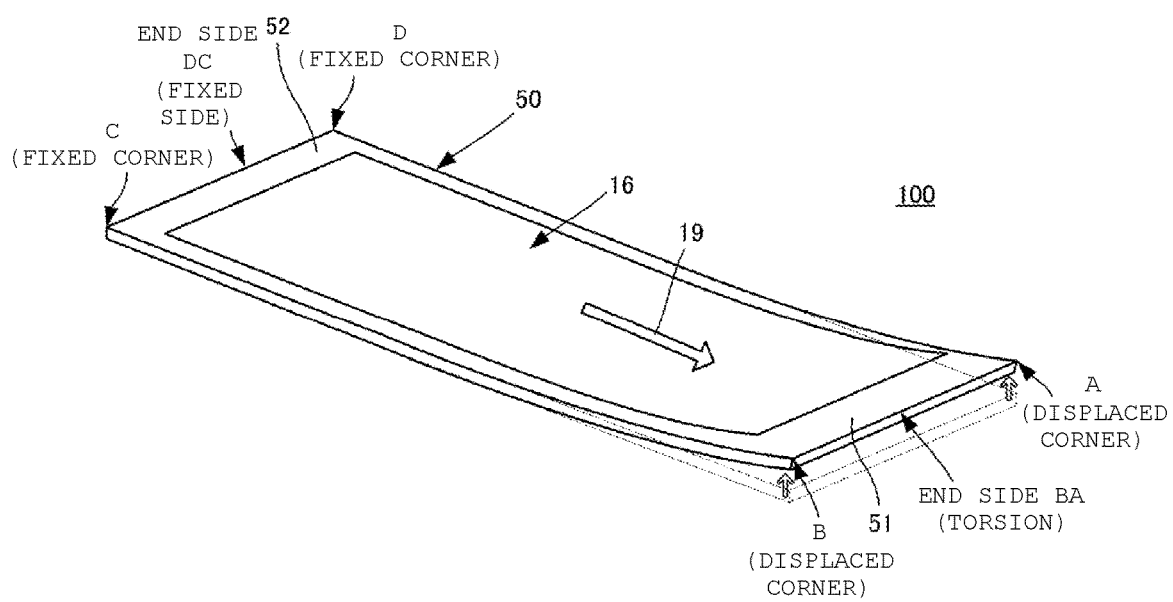
FIG. 6 is a conceptual diagram of bending of the substrate 50 shown in FIG. 5.
Figure 7:
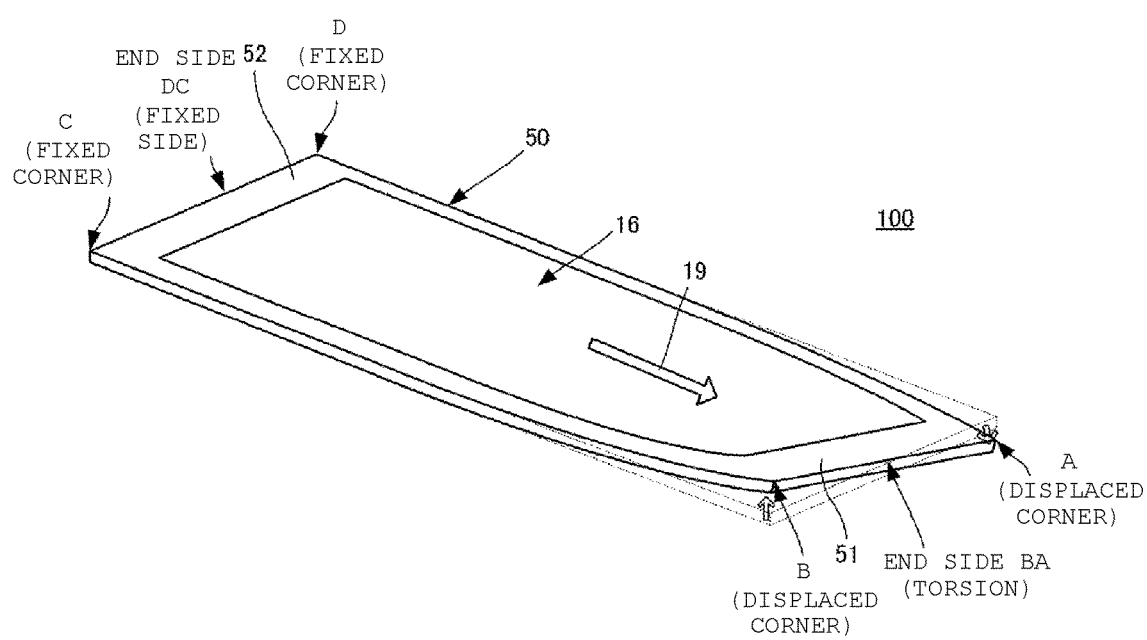
FIG. 7 is a conceptual diagram of torsion of the substrate 50 shown in FIG. 5.

Next, the detection method of the torsion sensor 100 will be described in more detail. FIG. 5 is an external view schematically illustrating the sensor unit 16 and the substrate 50 of the torsion sensor 100 shown in FIG. 1. FIG. 6 is a conceptual diagram of bending of the substrate 50 shown in FIG. 5. FIG. 7 is a conceptual diagram of torsion of the substrate 50 shown in FIG. 5.

It is noted that FIG. 6 shows a case where the second end 52 of the substrate 50 has an end side DC as a fixed end side, while the first end 51 has an end side BA bent. In other words, a case is shown where the corner D and the corner C, which serve as both ends of the fixed end side DC, serve as fixed angles, while the corner B and the corner A, which are both sides of the end side BA, are both displaced in the same direction.

In addition, FIG. 7 shows a case where the second end 52 of the substrate 50 has an end side DC as a fixed end side, while the end side BA of the first end 51 has torsion generated. In other words, a case is shown where the corner D and the corner C, which serve as both ends of the fixed end side DC, serve as fixed angles, while the corner B and the corner A, which are both sides of the end side BA, are displaced in mutually opposite directions.

(Bending Displacement Detection)

As shown in FIG. 5, when the bending displacement is 0, that is, when any external force that causes bending is not applied to the substrate 50, the substrate 50 is flat.

In this case, the piezoelectric film 31 of the sensor unit 16 is not stretched or shrunk, and the voltage output from the sensor unit 16 undergoes no change. For example, if the voltage is preliminarily set to be 0 [V] in this condition, the voltage output from the sensor unit 16 will be 0 [V].

Then, as shown in FIG. 6, when an external force that causes bending is applied to the substrate 50, the substrate 50 is curved in the longitudinal direction. In this case, the piezoelectric film 31 of the sensor unit 16 is stretched or shrunk, depending on the surface attached to the substrate 50 and the bending direction.

However, the stretching direction 19 of the piezoelectric film 31 coincides with the longitudinal direction of the substrate 50, and the elongation or compression direction of the piezoelectric film 31 coincides with the stretching direction 19. In this regard, since the piezoelectric film 31 undergoes no shear deformation, no electric charge is generated due to the piezoelectric constant $d_{14}$. More specifically, the voltage output from the sensor unit 16 undergoes no change due to the bending displacement. More specifically, the voltage output from the sensor unit 16 is 0 [V].

(Torsional Displacement Detection)

As shown in FIG. 5, when the torsional displacement is 0, that is, when any external force that causes torsion is applied to the substrate 50, the substrate 50 is flat.

In this case, the piezoelectric film 31 is not stretched or shrunk, and the voltage output from the sensor unit 16 undergoes no change. For example, if the voltage is preliminarily set to be 0 V in this condition, the voltage output from the sensor unit 16 will be 0 V.

Then, as shown in FIG. 7, when an external force that causes torsion is applied to the substrate 50, the corner A and the corner B at the substrate 50 are displaced respectively in different directions.

In this case, the piezoelectric film 31 undergoes shear deformation, depending on the surface attached to the substrate 50 and the torsional direction. The piezoelectric effect of the shear deformation generates an electric charge, thereby causing a change in the voltage output from the sensor unit 16. More specifically, the voltage output from the sensor unit 16 changes from 0 V to a predetermined voltage value (for example, several volts).

Therefore, the torsion sensor 100 can detect whether the substrate 50 undergoes torsion or not through the observation of the voltage output from the sensor unit 16 with the detection circuit 39. Then, the detection circuit 39 outputs the detection result from the output terminal 390 to an external control circuit or the like.

In the foregoing configuration, as shown in FIG. 1, the first end 51 is inserted to a predetermined position in the container 80. In addition, the first end 51 is inserted in the center of the rotating powder 8. Therefore, as shown in FIG. 7, the angle A and angle B of the first end 51 of the substrate 50 are displaced in the opposite directions due to the movement of the agitated powder 8, and the first end 51 thereof is deformed into a torsional shape. This deformation returns, on reaching equal to or more than a certain level, to some extent due to the elasticity of the substrate 50.

Thus, while the first end 51 comes into contact with the powder 8 to be stirred, the torsion sensor 100 repeatedly undergoes the torsion due to the flow of the powder 8 and the return due to the elasticity of the substrate 50. Accordingly, in the piezoelectric film 31, the piezoelectric effect generates an electric charge, thereby causing a change in the voltage output from the sensor unit 16.

Then, when the powder 8 stored in the container 80 decreases beyond a predetermined position, the first end 51 of the substrate 50 is not inserted in the powder 8. More specifically, as shown in FIG. 5, the substrate 50 returns to the original shape without any torsion of the first end 51. Accordingly, the voltage output from the sensor unit 16 becomes 0 V.

As described above, the torsion sensor 100 can detect whether the powder 8 is stored up to a predetermined position, based on the torsional state of the substrate 50.

On the other hand, in the fluid storage device 101, external vibration including the vibration caused by the agitation of the powder 8 may also propagate from the second end 52 to the torsion sensor 100. Therefore, as shown in FIG. 6, the torsion sensor 100 may also cause bending displacement due to the external vibration.

However, in the torsion sensor 100, as described previously, the voltage output from the sensor unit 16 undergoes no change due to the bending displacement. More specifically, the torsion sensor 100 is a sensor that detects torsion of the substrate 50, but not a sensor that detects bending of the substrate 50. Generally, the possibility that substrate 50 causes torsional vibration due to external vibration is extremely low as compared with the possibility that the substrate 50 causes bending vibration due to external vibration. Therefore, the torsion sensor 100 can prevent false detection due to external vibration.

Therefore, the fluid storage device 101 can detect the amount of the powder 8, and prevent false detection due to external vibration.

Further, when the fluid storage device 101 detects, for example, the powder 8 which is not stored up to a predetermined position, the fluid storage device 101 replenishes a toner from the toner bottle into the container 80.

A fluid storage device according to a second exemplary embodiment will be described below.

Figure 8:
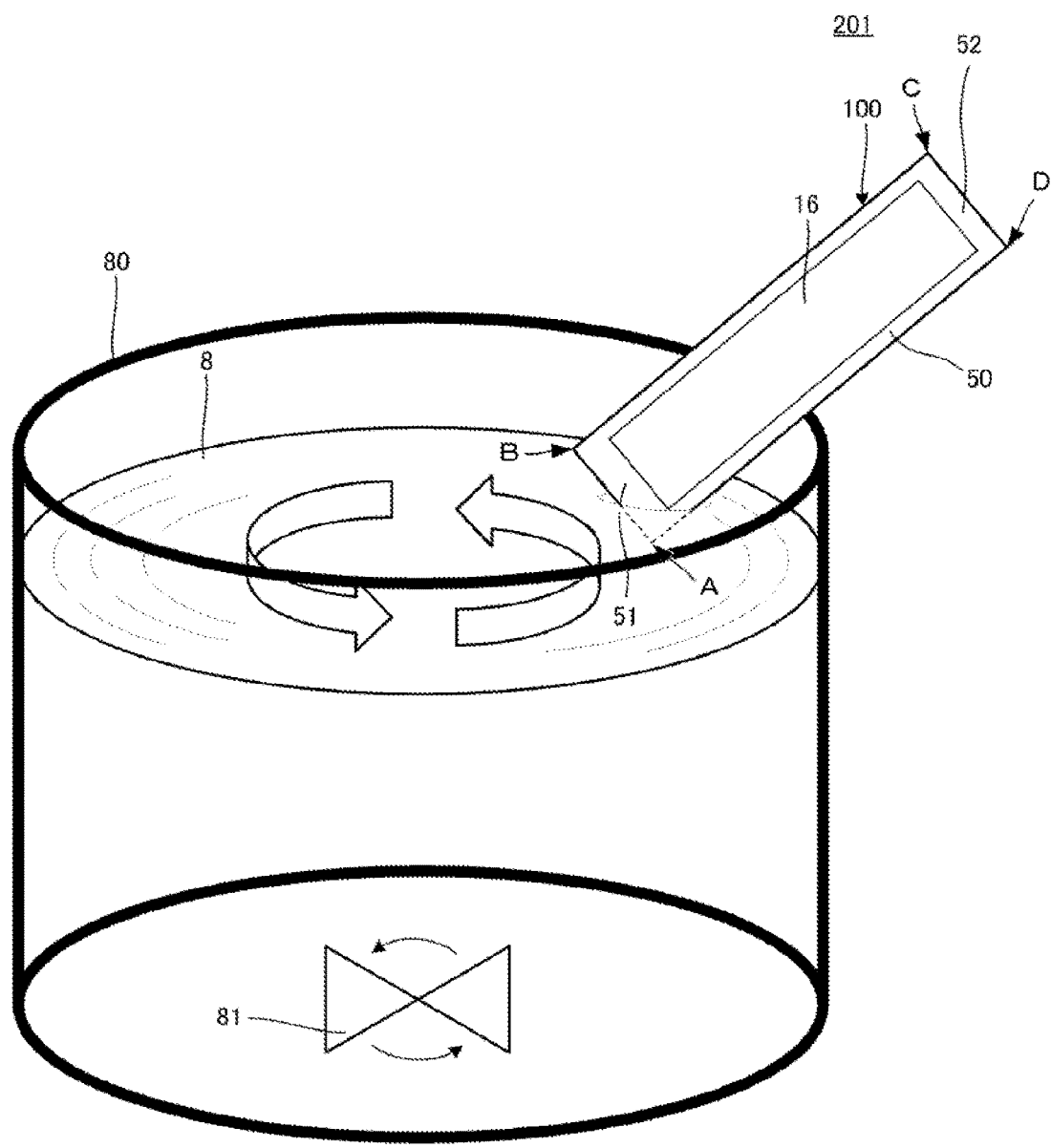
FIG. 8 is an external view schematically illustrating a fluid storage device 201 according to a second exemplary embodiment.

FIG. 8 is an external view schematically illustrating a fluid storage device 201 according to a second exemplary embodiment. The difference of the fluid storage device 201 from the fluid storage device 101 is the method of disposing the torsion sensor 100. In the fluid storage device 201, only a corner A, which is one of corners A and B, is inserted into a powder 8. The other is configured in the same fashion, and the explanation thereof will be thus omitted.

In the fluid storage device 201, the corner A of a substrate 50 is displaced by the movement of the agitated powder 8, thereby deforming a first end 51 into a torsional shape. When the powder 8 stored in a container 80 decreases beyond a predetermined position, the substrate 50 returns to the original shape without any torsion of the first end 51, as shown in FIG. 5. Therefore, also in the fluid storage device 201, a torsion sensor 100 can detect whether the powder 8 is stored up to a predetermined position, based on the torsional state of the substrate 50.

In addition, in the torsion sensor 100, as described previously, the voltage output from the sensor unit 16 undergoes no change due to the bending displacement.

Therefore, the fluid storage device 201 can, as with the fluid storage device 101, detect the amount of the powder 8, and prevent false detection due to external vibration.

A fluid storage device according to a third exemplary embodiment will be described below.

Figure 9:
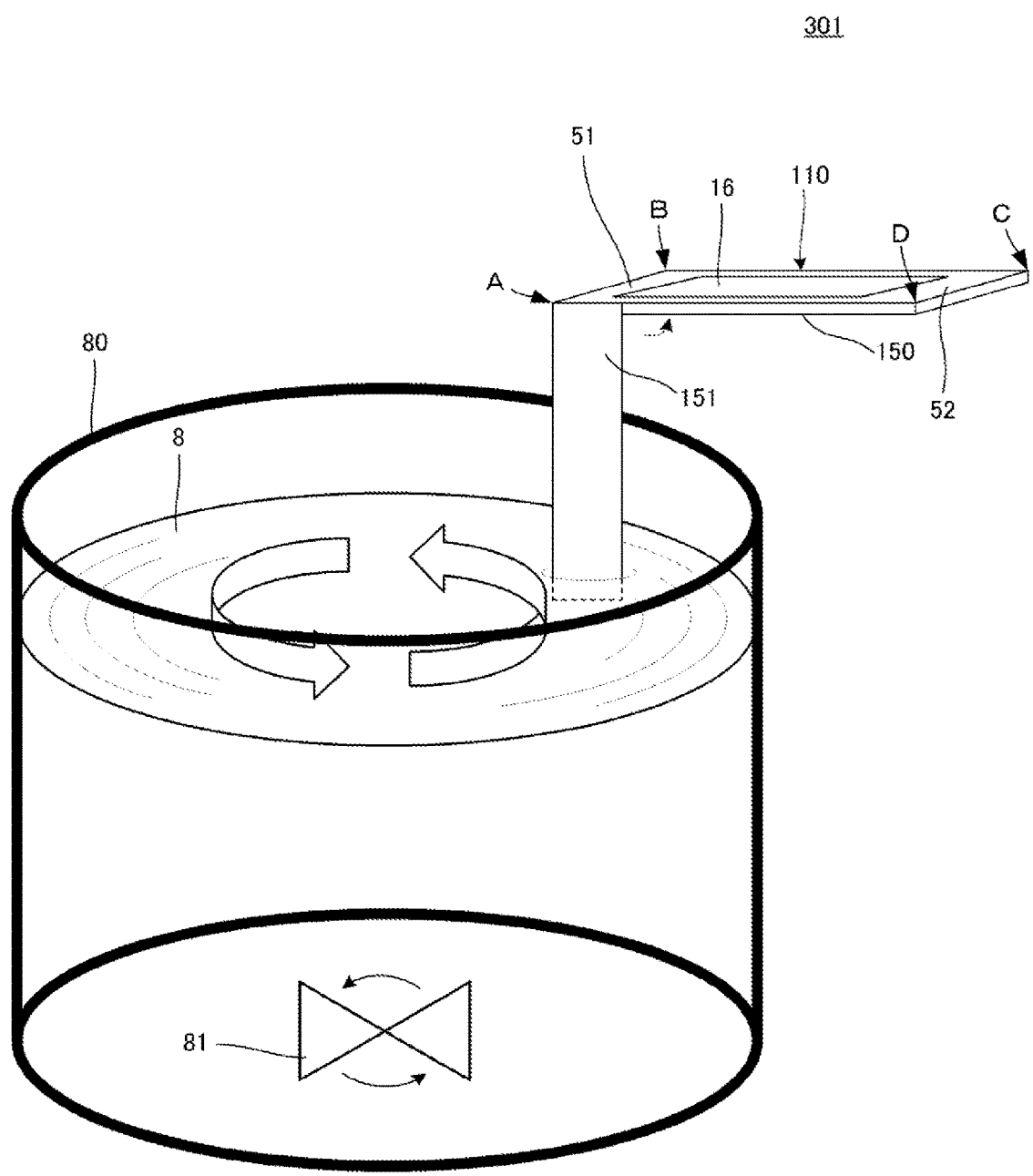
FIG. 9 is an external view schematically illustrating a fluid storage device 301 according to a third exemplary embodiment.

FIG. 9 is an external view schematically illustrating a fluid storage device 301 according to a third exemplary embodiment. The differences of the fluid storage device 301 from the fluid storage device 101 are a torsion sensor 110 and the method of disposing the torsion sensor 110. The difference of the torsion sensor 110 from the torsion sensor 100 is that a substrate 150 has a connection plate 151 connected to a corner A, with connection plate 151 in turn being inserted into a powder 8. The other components of this embodiment are configured in the same fashion as described above, and the explanation thereof will be thus omitted.

It is to be noted that the connection plate 151 corresponds to an example of the "connection" according to the present disclosure.

In the fluid storage device 301, the connection plate 151 of the substrate 150 is displaced by the movement of the agitated powder 8, the corner A is displaced in the direction of a dotted arrow by the displacement of the connection plate 151, and a first end 51 is deformed into a torsional shape. When the powder 8 stored in a container 80 decreases beyond a predetermined position, the substrate 50 returns to the original shape without any torsion of the first end 51, as shown in FIG. 5. Therefore, also in the fluid storage device 301, a torsion sensor 110 can detect whether the powder 8 is stored up to a predetermined position, based on the torsional state of the substrate 150.

In addition, in the torsion sensor 110, as described previously, the voltage output from the sensor unit 16 undergoes no change due to the bending displacement.

Therefore, the fluid storage device 301 can, as with the fluid storage device 101, detect the amount of the powder 8, and prevent false detection due to external vibration.

A fluid storage device according to a fourth exemplary embodiment will be described below.

Figure 10:
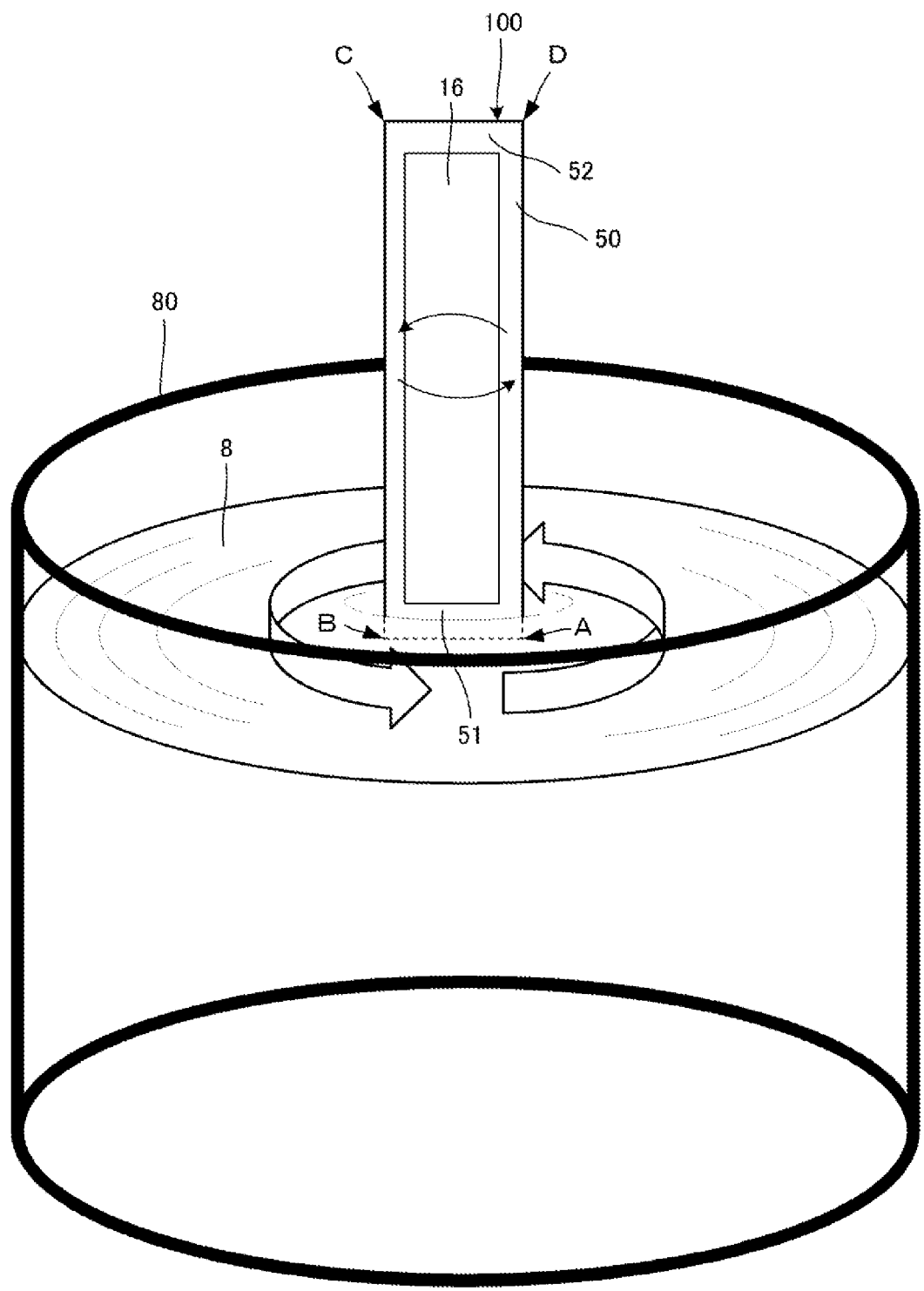
FIG. 10 is an external view schematically illustrating a fluid storage device 401 according to a fourth exemplary embodiment.

FIG. 10 is an external view schematically illustrating a fluid storage device 401 according to a fourth exemplary embodiment. The fluid storage device 401 differs from the fluid storage device 101 described above in that a powder 8 is agitated by a substrate 50 of a torsion sensor 100 without including a stirrer 81, as shown in FIG. 1, for example. Thus, the fluid storage device 401 rotates the torsion sensor 100 in the direction of the arrow shown in FIG. 10. The other components of the exemplary embodiment are configured in the same fashion, and the explanation thereof will be thus omitted.

In the fluid storage device 401, a first end 51 of the substrate 50 is deformed into a torsional shape by the movement of the agitated powder 8. When the powder 8 stored in a container 80 decreases beyond a predetermined position, the substrate 50 returns to the original shape without any torsion of the first end 51, as shown in FIG. 5. Therefore, in the fluid storage device 401, the torsion sensor 100 can detect whether the powder 8 is stored up to a predetermined position based on the torsional state of the substrate 50 by rotating the torsion sensor 100.

In addition, in the torsion sensor 100, as described previously, the voltage output from the sensor unit 16 undergoes no change due to the bending displacement.

Therefore, the fluid storage device 401 can, as with the fluid storage device 101, detect the amount of the powder 8, and prevent false detection due to external vibration. Furthermore, the fluid storage device 401 can reduce the manufacturing cost, since the stirrer device 81 can be omitted.

It is to be noted that, also in the fluid storage device 201, as with the fluid storage device 401, the powder 8 may be agitated by the substrate 50 of the torsion sensor 100 without including any stirrer 81. In addition, also in the fluid storage device 301, as with the fluid storage device 401, the powder 8 may be agitated by the connection plate 151 of the torsion sensor 110 without including any stirrer 81.

Other Embodiments

It is to be noted that according to the exemplary embodiment described above, the fluid storage device 101 stores the powder 8 as a fluid, but the exemplary embodiments should not be so limited. In practice, the fluid storage device may store, for example, a liquid as a fluid, which can be a chemical liquid or ink, for example.

In addition, according to the exemplary embodiment described above, the detection circuit 39 detects whether the substrate 50 undergoes torsion or not through the observation of the voltage, but the exemplary embodiment is not to be considered limited thereto. In practice, the detection circuit 39 may measure the value of the voltage output from the sensor unit 16. The detection circuit 39 can also detect the torsional direction and the torsion amount from the value of the voltage. For example, the torsional direction indicates the rotation direction of the fluid, and the torsion amount indicates the amount of the fluid stored in the container 80.

Figure 11:
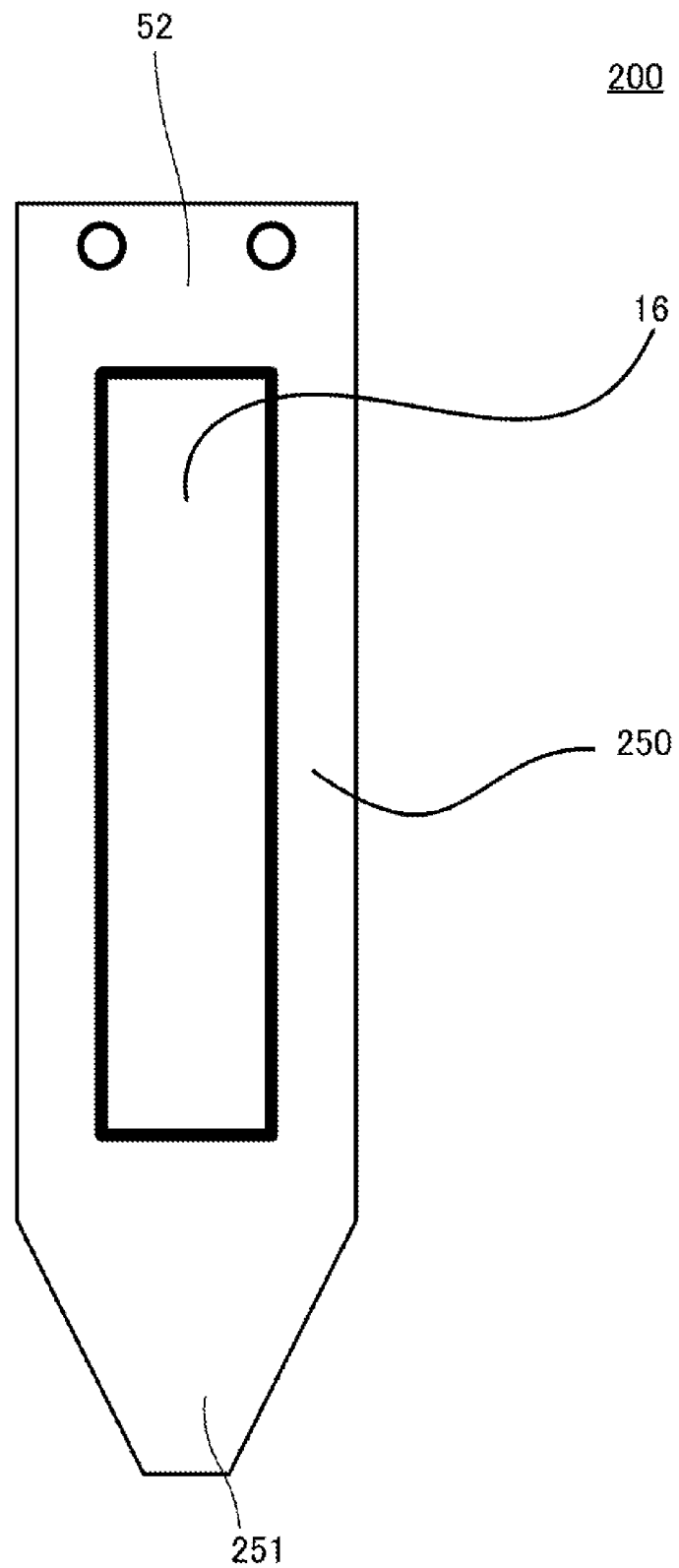
FIG. 11 is a front view illustrating a modification example of the torsion sensor 100 shown in FIG. 1.
Figure 12:
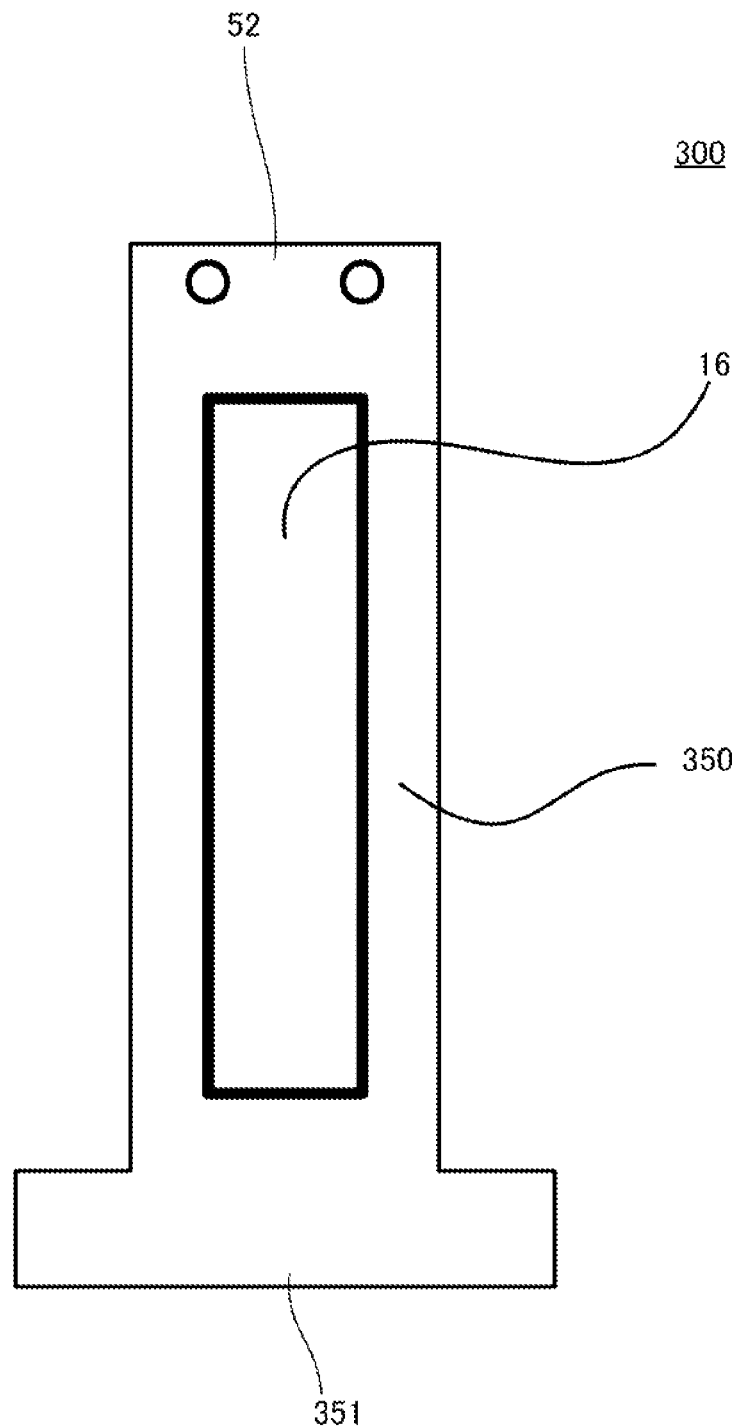
FIG. 12 is a front view illustrating a modification example of the torsion sensor 100 shown in FIG. 1.

In addition, depending on the viscosity and particle size of the fluid, the agitated fluid varies the magnitude of the force applied to the substrate. Therefore, the substrate 50 has a rectangular shape according to the exemplary embodiment mentioned previously, but it is not to be considered limited thereto. In practice, in order to generate proper torsion, a substrate 250 that has a first end 251 thinner than the first end 51 may be used like a torsion sensor 200 as shown in FIG. 11. In contrast, a substrate 350 that has a first end 351 thicker than the first end 51 may be used like a torsion sensor 300 as shown in FIG. 12.

In addition, according to the exemplary embodiment mentioned previously, the sensor unit 16 is attached on the substrate 50 as shown in FIGS. 2 and 3, but it is not to be considered limited thereto. In practice, a thin metal plate may be provided in order to increase the elastic constant of the torsion sensor 100.

Furthermore, the sensor unit 16 may be sandwiched between the substrate 50 and the metal plate. Sandwiching a signal detection electrode of the sensor unit 16 between the metal plate and a reference electrode of the sensor unit 16 with the metal plate as a ground electrode make the torsion sensor 100 resistant to noise from the outside.

In addition, according to the exemplary embodiment mentioned previously, the torsion sensor 100 has the piezoelectric film 31 attached to the substrate 50, and torsion of the substrate 50 is detected by the piezoelectric film 31, but it is not to be considered limited thereto. In practice, the torsion sensor may be made from a material that has no piezoelectricity.

The torsion sensor includes, for example, an elastic body and an electrode formed on the main surface of the elastic body. When the elastic body undergoes displacement, the electrode elongates in the direction of the displacement. More specifically, the electrode increases in length and decreases in width in accordance with the displacement. The resistance value changes accordingly.

This torsion sensor can detect this change in resistance value, thereby detecting the torsional displacement of the torsional displacement detection target. In particular, the disposition of the electrode in a direction along torsion of the elastic body is preferred, because the detection sensitivity is increased. For example, such a torsion sensor can be applied to the exemplary embodiments, even if the sensor is made from a material that has no piezoelectricity.

Finally, the foregoing descriptions of the embodiments mentioned previously should be considered exemplary in all respects, but not be considered limiting. The scope of the exemplary embodiments of the present disclosure is specified by the claims, but not by the embodiments described above. Furthermore, the scope of the present invention encompasses the scope equivalent to the claims.

DESCRIPTION OF REFERENCE SYMBOLS

8: powder
16: sensor unit
19: stretching direction
30: flexible printed board
31: piezoelectric film
32: first terminal
33: second terminal
34: first detection electrode
35: second detection electrode
36, 37: printed board unit
38: component mounting unit
39: detection circuit
50: substrate
51: first end
52: second end
80: container
81: stirrer
91, 92: pressure-sensitive adhesive layer
100: torsion sensor
101: fluid storage device
110: torsion sensor
150: substrate
151: connection plate
200: torsion sensor
201: fluid storage device
250: substrate
251: first end
300: torsion sensor
301: fluid storage device
350: substrate
351: first end
390: output terminal
401: fluid storage device

The invention claimed is:
1. A fluid storage device comprising:
a container configured to store a fluid; and
a torsion sensor including a substrate and a piezoelectric element configured to detect a torsion of the substrate when the fluid is stirred by a stirring mechanism not coupled to the torsion sensor,
wherein the substrate has a first free end extending in the container and a second fixed end,
wherein the piezoelectric film is configured to generate an electric charge when the fluid is stirred to change a voltage output from the torsion sensor indicating a presence of the liquid in the container, and
wherein the torsion sensor is configured such that the piezoelectric element does not generate the electric charge in response to a bending displacement of the substrate.

2. The fluid storage device according to claim 1, wherein the first free end is inserted to a predetermined position into the container.

3. The fluid storage device according to claim 1, wherein the first free end is configured to agitate the fluid in the container, such that the fluid is rotated in the container causing the torsion of the substrate.

4. A fluid storage device comprising:
a container configured to store a fluid; and
a torsion sensor including a substrate and a piezoelectric element configured to detect a torsion of the substrate when the fluid is stirred,
wherein the substrate has a first free end extending in the container and a second fixed end opposite the first free end, and
wherein the substrate has a rectangular shape extending into the container, such that the first free end has first and second corners being inserted into the container at a position, such that the first and second corners extend in opposite directions with respect to each other,
wherein the piezoelectric film is configured to generate an electric charge when the fluid is stirred to indicate a presence of the liquid in the container, and the torsion sensor is configured such that the piezoelectric element does not generate the electric charge in response to a bending displacement of the substrate.

5. The fluid storage device according to claim 4, wherein the first end is inserted in a center of the fluid relative to a cross-section of the container.

6. The fluid storage device according to claim 4, wherein only one of the first corner and the second corner of the first free end of the substrate is inserted in the fluid.

7. The fluid storage device according to claim 4, wherein the substrate comprises a connection plate extending into the container to be inserted in the fluid.

8. The fluid storage device according to claim 1, wherein the piezoelectric element is directly coupled to the substrate.

9. The fluid storage device according to claim 8, wherein the piezoelectric element is configured to detect the torsion of the substrate when the fluid is stirred.

10. The fluid storage device according to claim 9, wherein the piezoelectric element comprises a film comprising a chiral polymer.

11. The fluid storage device according to claim 10, wherein the chiral polymer is a polylactic acid.

12. The fluid storage device according to claim 10, wherein the film includes a stretching direction that coincides with a longitudinal direction of the substrate.

13. The fluid storage device according to claim 1, further comprising a stirrer disposed within the container and configured to stir the liquid, such that the stirred fluid causes the torsion of the substrate.

14. A fluid storage device comprising:
a container configured to store a fluid;

a torsion sensor including a substrate that has a first end fixed to at least one of the container and a housing of the fluid storage device and a second end disposed in the container; and a piezoelectric element coupled to the substrate and configured to generate an electric charge when the fluid is stirred in the container, such that the torsion sensor generates a voltage indicating a presence of the liquid in the container, wherein the torsion sensor is configured such that the piezoelectric element does not generate the electric charge in response to a bending displacement of the substrate.

15. The fluid storage device according to claim 14, wherein the second end is configured to agitate the fluid in the container, such that the fluid is rotated.

16. The fluid storage device according to claim 14, further comprising a stirrer disposed within the container and configured to stir the liquid such that the stirred fluid causes the torsion of the substrate.

17. The fluid storage device according to claim 14, wherein the piezoelectric element comprises a film comprising a chiral polymer.

18. The fluid storage device according to claim 17, wherein the film includes a stretching direction that coincides with a longitudinal direction of the substrate.

19. The fluid storage device according to claim 14, wherein the second end has a first corner and a second corner, with the second end being inserted into the container at a position such that the first and second corners extend in opposite directions with respect to each other.

20. A fluid storage device comprising:
a container configured to store a fluid; and
a torsion sensor including a substrate and configured to detect a torsion of the substrate when the fluid is stirred,
wherein the substrate has a first free end extending in the container and a second fixed end, and
wherein the torsion sensor is configured such that the torsion sensor does not detect a bending displacement of the substrate.

21. The fluid storage device according to claim 20, wherein the torsion sensor is configured to prevent a false detection due to an external vibration that causes the bending displacement of the substrate.

* * * * *